United States Patent
Nakanishi et al.

(10) Patent No.: US 8,599,683 B2
(45) Date of Patent: Dec. 3, 2013

(54) SYSTEM AND METHOD FOR CHANGING A DELIVERY PATH OF MULTICAST TRAFFIC

(75) Inventors: Takayuki Nakanishi, Kawasaki (JP); Hiroshi Etori, Machida (JP)

(73) Assignee: Fujitsu Limited, Kawasaki (JP)

( * ) Notice: Subject to any disclaimer, the term of this patent is extended or adjusted under 35 U.S.C. 154(b) by 78 days.

(21) Appl. No.: 13/422,293

(22) Filed: Mar. 16, 2012

(65) Prior Publication Data

US 2012/0263035 A1 Oct. 18, 2012

(30) Foreign Application Priority Data

Mar. 18, 2011 (JP) ................................ 2011-061547

(51) Int. Cl.
*H04L 12/26* (2006.01)
*H04L 12/28* (2006.01)
*G06F 15/173* (2006.01)

(52) U.S. Cl.
USPC ............................ 370/225; 370/390; 709/239

(58) Field of Classification Search
None
See application file for complete search history.

(56) References Cited

U.S. PATENT DOCUMENTS

| | | | |
|---|---|---|---|
| 7,099,323 B1 * | 8/2006 | Doong et al. | 370/390 |
| 7,355,968 B2 * | 4/2008 | Liu et al. | 370/225 |
| 7,957,287 B2 * | 6/2011 | Venkatachalam | 370/232 |
| 8,218,430 B2 * | 7/2012 | Zhao | 370/218 |
| 8,456,982 B2 * | 6/2013 | Xu et al. | 370/223 |
| 2005/0190765 A1 * | 9/2005 | Gotoh et al. | 370/390 |
| 2007/0140107 A1 * | 6/2007 | Eckert et al. | 370/216 |

FOREIGN PATENT DOCUMENTS

| | | |
|---|---|---|
| JP | 2005-94137 | 4/2005 |
| JP | 2008-28714 | 2/2008 |

* cited by examiner

*Primary Examiner* — Clemence Han
(74) *Attorney, Agent, or Firm* — Staas & Halsey LLP

(57) ABSTRACT

Multicast traffic is transferred, via routers, from a sender to receivers through a delivery tree that is determined based on a multicast routing protocol and includes delivery paths each communicably coupling the sender and one receiver. A router includes a multicast routing table used for transferring the multicast traffic through the delivery tree. The router generates delivery path information on first and second delivery paths each communicably coupling the sender and the router. Upon detecting a link failure on the first delivery path, the router performs delivery-path change processing that switches a first pair of interfaces along the first delivery path to a second pair of interfaces along the second delivery path without waiting for the multicast routing table being updated using the multicast protocol, and transmits a delivery-path change message to routers along the second delivery path so that the routers perform the delivery-path change processing.

9 Claims, 12 Drawing Sheets

R1, R2, R3 ··· : NODE ADDRESSES (OR INTERFACE ADDRESSES)

S1, S2, S3: MULTICAST SENDER ADDRESSES
G*: MULTICAST GROUP ADDRESSES ASSOCIATED WITH SAME SENDER
OIF1, OIF2, OIF3: OUTGOING INTERFACE INFORMATION
IIF1, IIF2, IIF3: INCOMING INTERFACE INFORMATION

| SOURCE ADDRESS | DESTINATION ADDRESS | INTERFACE ID | METRIC |
|---|---|---|---|
| X.X.X.X. | X.X.X.X. | X | X |
| X.X.X.X. | X.X.X.X. | X | X |
| X.X.X.X. | X.X.X.X. | X | X |
| X.X.X.X. | X.X.X.X. | X | X |
| X.X.X.X. | X.X.X.X. | X | X |

| MULTICAST ENTRY | IN/OUT | INTERFACE ID |
|---|---|---|
| (S1, G1) | IN | A |
| | OUT | C |
| (S1, G2) | IN | A |
| | OUT | C |
| (S1, G3) | IN | A |
| | OUT | D |
| (S1, G4) | IN | B |
| | OUT | C |

| MULTICAST ENTRY | INCOMING INTERFACE ID | ROUTER ADDRESSES |
|---|---|---|
| (S1, G1) | A | A4 A6 |
| | B | A3 A5 A4 A6 |

SYSTEM AND METHOD FOR CHANGING A DELIVERY PATH OF MULTICAST TRAFFIC

CROSS-REFERENCE TO RELATED APPLICATION

This application is based upon and claims the benefit of priority of the prior Japanese Patent Application No. 2011-061547, filed on Mar. 18, 2011, the entire contents of which are incorporated herein by reference.

FIELD

The embodiment discussed herein is related to a system and method for changing a delivery path of multicast traffic.

BACKGROUND

In an IP multicast network, a multicast routing table is generated in each of packet exchanger devices such as routers, using a multicast routing protocol such as PIM-SM (Protocol Independent Multicasting-Sparse Mode). Transfer of multicast traffic such as a multicast packet is handled using a multicast routing table.

In multicast packet transfer, delivery of multicast packets to a multicast group is started and stopped according to a join message (request to join the multicast group) and a leave message (request to leave the multicast group), respectively, based on a multicast routing protocol. Multicast traffic such as a multicast packet is transferred from a sender (or a source) to a plurality of receivers belonging to a multicast group through a delivery tree (or a multicast distribution tree) including a set of delivery paths each communicably coupling the sender and one of the plurality of receivers.

Further, in the multicast packet transfer, in general, a unicast routing protocol is also used together with the multicast routing protocol. The router determines a first priority interface based on the unicast routing protocol, and sends a control message according to the multicast routing protocol, such as join and leave messages described above, via the determined first priority interface. Stating and stopping the delivery of multicast traffic are controlled using a path for transmitting control messages.

During multicast traffic being delivered, in some cases, a line failure may occur on a delivery tree that is a set of delivery paths along which the multicast traffic is transferred, or network topology including the delivery tree may change. In this case, each of routers related to the delivery tree relearns a unicast communication path using the unicast routing protocol. Then, each of the routers again determines a first priority interface corresponding to a destination address of a multicast packet, according to the result of relearning the unicast communication path. Here, the process for determining first priority interfaces for all the routers relating to the delivery tree is also called the convergence of a unicast routing protocol regarding the delivery tree.

Thereafter, transmission of a multicast control packet (a join message) is performed as to the first priority interface of each of the routers. Then, a reception request message is transferred, on a hop-by-hop basis, from the most downstream router to the most upstream router so that each of the routers relating to the delivery tree relearns a delivery path, where the most downstream router is a router that is located at the most downstream point along the delivery tree and accommodates a destination (client) of the multicast traffic, which is also called a last hop router, and the most upstream router is a router that is located at the most upstream point along the delivery tree and is accommodated by a sender (a server) of the multicast traffic, which is also called a first hop router. After the relearning of delivery paths is completed, in other words, after the convergence of the multicast routing protocol regarding the delivery tree, the delivery of the multicast traffic is re-started according to a new delivery tree that has been made by relearning the delivery paths.

Japanese Laid-open Patent Publication No. 2008-28714 discusses a related topic.

SUMMARY

According to an aspect of the invention, a system for changing a delivery path of multicast traffic is provided. The system includes a plurality of routers via which the multicast traffic is transferred from a sender to a plurality of receivers through a delivery tree that is determined at least based on a multicast routing protocol and includes a set of delivery paths each communicably coupling the sender and one of the plurality of receivers. Each of the plurality of routers is configured to include a multicast routing table storing transfer control information for transferring the multicast traffic through the delivery tree. The each router generates delivery path information that stores information on a first delivery path used for transferring the multicast traffic in a normal operational state, and information on a second delivery path used as an alternative to the first delivery path when the first delivery path is not working. The each router performs, upon detecting a link failure on the first delivery path, delivery-path change processing, based on the delivery path information, that changes an active pair of interfaces for actually transferring the multicast traffic, from a first pair of interfaces along the first delivery path to a second pair of interfaces along the second delivery path without waiting for the multicast routing table being updated using the multicast protocol, and the each router transmits a delivery-path change message to first one or more routers positioned along the second delivery path so that the first one or more routers perform the delivery-path change processing based on the delivery-path change message. The each router further performs, upon receiving a delivery-path change message, the delivery-path change processing based on the received delivery-path change message.

The object and advantages of the invention will be realized and attained by means of the elements and combinations particularly pointed out in the claims.

It is to be understood that both the foregoing general description and following detailed description are exemplary and explanatory and are not restrictive of the invention, as claimed.

BRIEF DESCRIPTION OF DRAWINGS

FIG. 11B is a diagram illustrating a configuration example of a unicast routing table, according to an embodiment;

FIG. 11C is a diagram illustrating a configuration example of a multicast routing table, according to an embodiment; and FIG. 11D is a diagram illustrating a configuration example of delivery path information, according to an embodiment.

DESCRIPTION OF EMBODIMENT

According to a multicast protocol such as a PIM-SM or PIM-SSM (PIM-Source Specific Multicast), when a failure or a change in network topology occurs, a router located on the downstream side of the delivery tree sends a PIM join message to a router located on the upstream side of the delivery tree, and the delivery tree is changed, in a hop-by-hop basis, by each of the routers relating to the delivery tree. Thus, it takes much time to attain the convergence of the multicast protocol regarding the delivery tree in which all the relevant delivery paths have been changed by the relevant routers so as to generate a new delivery tree. Thus, there is a problem in that the delivery of multicast traffic is interrupted for a long time period when a failure or a change in network topology has occurred.

Hereinafter, embodiments will be explained with reference to the drawings. Configurations described below are exemplary only, and do not limit the embodiments.

Figure 1:
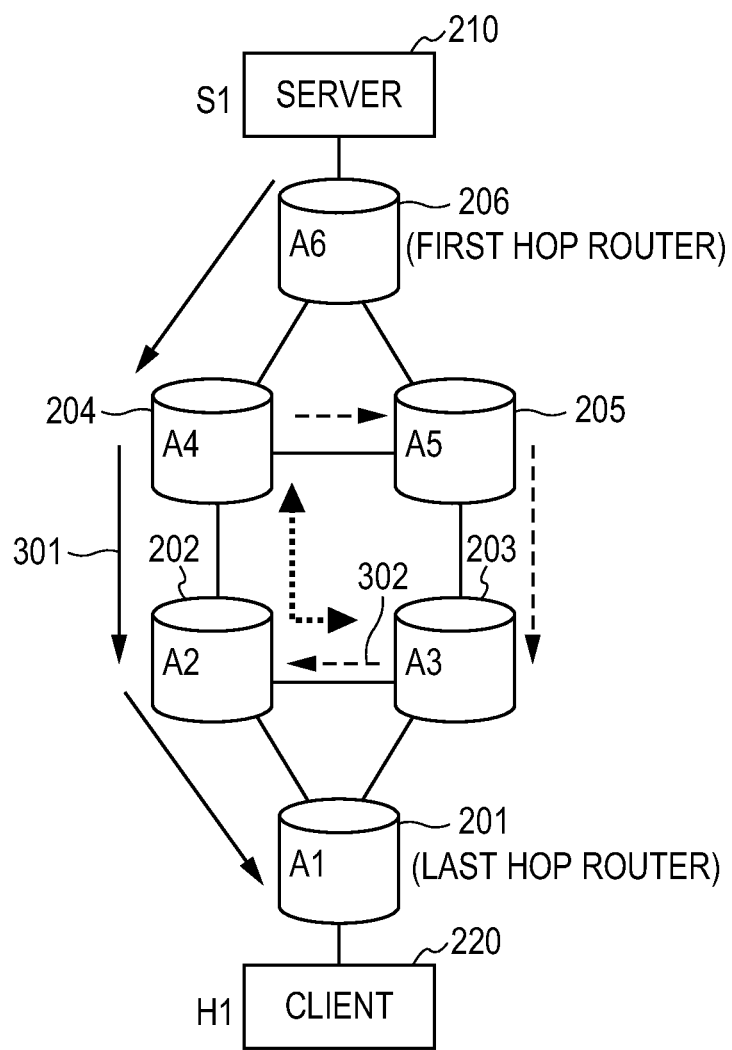
FIG. 1 is a diagram illustrating an example of a multicast network system, according to an embodiment.

FIG. 1 is a diagram illustrating an example of a multicast network system, according to an embodiment. The example of FIG. 1 indicates a portion of a multicast network, and includes a multicast delivery server 210 (also referred to as a sender 51), routers 201-206 (nodes A1-A6) capable of joining and leaving a multicast group, and a client 220 (also referred to as a receiver H1). Here, a plurality of clients may be included in the multicast network (not depicted in FIG. 1)

The routers 201-206 each generate a delivery tree (a set of delivery paths) of multicast traffic originating from the server 210, using a unicast routing protocol such as a RIP (Routing Information Protocol) or an OSPF (Open Shortest Path First), and a multicast routing protocol such as a PIM-SM or a PIM-SSM. Then, the routers 201-206 each transfer a multicast packet according to the generated delivery tree.

The routers 201-206 are each capable of detecting link states, such as connection/disconnection of lines that connecting the routers 201-206 to each other and a failure occurrence of the lines, using the unicast routing protocol. This allows routers 201-206 to share failure information on the delivery tree in the multicast network.

The client 220 (receiver H1) receives multicast traffic (for example, IP multicast packets) delivered from the server 210 (sender S1). Here, it is assumed that the client 220 belongs to a multicast group G1 with regard to reception of a multicast packet from the server 210. In general, a plurality of multicast groups G1 to Gn (n is a natural number) may be implemented in a multicast network, and a plurality of clients belong to a multicast group. Hereinafter, for convenience of explanation, a multicast group G1 will be used as a typical multicast group, and client 220 will be used as a typical client belonging to multicast group G1.

A multicast packet (multicast traffic) delivered from the server 210 is transferred along a delivery tree that is provided between the server 210 and the client 220. The delivery tree of the multicast group G1 having the server 210 as a sender, may be configured, for example, to include a primary delivery path denoted by a directional sequence of routers: 210 (S1)→206 (A6)→204 (A4)→202 (A2)→201 (A1)→220 (H1).

An exemplary case will be explained in which the router 202 (A2) located on the delivery tree collects information on an alternative delivery path as an alternative to the primary delivery path passing through a first interface of the router 202 via which multicast traffic is currently received, in the multicast network depicted in FIG. 1.

The router 202 receives multicast traffic from the router 204 that is located adjacent to the router 202 on the upstream side of the delivery tree. An interface, located on the upstream side of the delivery tree, via which the router 202 receives the multicast traffic is also referred to as "an incoming interface" of the router 202 regarding the multicast traffic. In the similar manner, an interface, located on the downstream side of the delivery tree, via which a router transmits the multicast traffic is also referred to as "an outgoing interface" of the router regarding the multicast traffic. In the case, the incoming interface of the router 202 becomes the outgoing interface of the router 204 from the point of view of the router 204 that is located adjacent to the router 202 on the upstream side of the delivery tree.

When a router according to the embodiment fails to receive the multicast traffic via the currently-used primary incoming interface due to a failure occurrence at a link or a node, the router tries to receive the multicast traffic via an alternative incoming interface (for example, an alternative input port). Hereinafter, the primary incoming interface and the alternative incoming interface will be also expressed as a "first (priority) incoming interface" and a "second (priority) incoming interface", respectively. The term "priority" may be sometimes appended so as to implicate that the first and second incoming interfaces are determined based on a priority order depending on cost or a metric that is assigned to a plurality of delivery paths each connecting the sender and the receiver along the delivery tree.

For a multicast entry (Sk, Gp), the router 202 determines a second incoming interface as an alternative to the first incoming interface with reference to unicast routing information (a unicast routing table) provided for the router 202, where k and p are variables each indicating a natural number, and the multicast entry (Sk, Gp) is information identifying multicast traffic that is used for a p-th multicast group identified by "Gp" and originates from a k-th sender identified by "Sk". In this case, the router 202 determines the second incoming interface for multicast entry (S1, G1) (identifying sender S1 and multicast group G1) based on a unicast routing table provided for the router 202. The router 202 transmits a delivery-path search message destined for the server 210 (sender S1) via the determined second incoming interface so as to check reachability of a packet transferred from the router 202 toward the server 210 (sender S1) and to determine a delivery path through which the packet is allowed to be transferred from the server 210 to router 202.

For example, the router 202 may learn that there exist a plurality of delivery paths between the router 202 and the server 210 using a unicast routing protocol. As depicted in FIG. 1, for example, the router 202 learns that there exist two delivery paths: a first delivery path passing through the router 204 and a second delivery path passing through the router 203.

Using a unicast routing protocol, the routers 201-206 may select a plurality of delivery paths reaching the server 210 and the costs or metrics of the selected plurality of communication paths, thereby learning a shortest delivery path reaching the server 210. Further, the routers 201-206 may each updates a unicast routing table for unicast communication in accordance with the learned result. When all the routers 201-206 complete the update of the unicast routing tables, the routers 201-206 turn into an operational state of the convergence of the unicast routing protocol.

At the same time, the routers 201-206 build a delivery tree for multicast traffic that is delivered from the server 210 (a sender) to the client 220 (a receiver) using a multicast routing protocol. In the case, when the all the routers 201-206 complete the generation of multicast routing tables according to the built delivery tree, the routers 201-206 turn into an operational state of the convergence of the multicast routing protocol regarding the multicast traffic.

In the operational state of the convergence of the unicast and multicast routing protocols, the router 202 is allowed to recognize an interface via which the router 202 receives multicast traffic from the router 204, as a first (priority) incoming interface for the multicast entry (S1, G1) identifying the sender S1 and the multicast group G1. Meanwhile, as will be described later, the router 202 may recognize, based on the unicast routing protocol, an interface via which the router 202 is allowed to receive the multicast traffic originating from the server 210 (sender), and determine the recognized interface as a second (priority) incoming interface that is alternative to the first incoming interface. In the case, an interface linked to the router 203 is determined to be the second incoming interface.

After determining the second incoming interface, the router 202 checks reachability of a packet transmitted from router 202 to the server 210 and selects a alternative delivery path that allows the packet to be transferred from the server 210 to the router 202, using a delivery-path search message destined for the server 210 (sender S1). Here, the router 202 transmits the delivery-path search message destined for the server 210 via the second incoming interface. In other words, the router 202 checks reachability of a packet and selects an alternative delivery path, regarding the second incoming interface connected to the router 203 that is located along a delivery path having a lower priority than the currently-used primary delivery path along which the router 204 is being located.

Figure 2A:
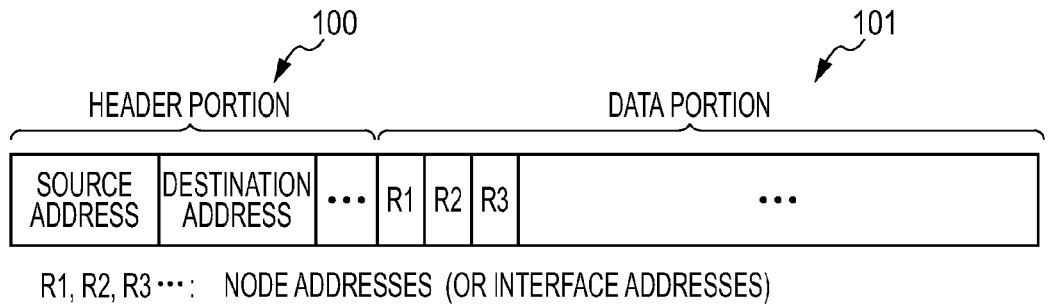
FIG. 2A is a diagram illustrating an example of a delivery-path search message, according to an embodiment.

FIG. 2A is a diagram illustrating an example of a delivery-path search message, according to an embodiment. In the following description, a router or a server will be collectively referred to as "a node" for convenience of explanation. The delivery-path search message may be configured to include a header portion 100 and a data portion 101. The header portion 100 includes a source address and a destination address, and the data portion 101 includes a sequence of node addresses identifying nodes or interfaces via which the delivery-path search message has been transferred, for example, node addresses R1 to R3 as depicted in FIG. 2A. For example, IP addresses assigned to the node or IP addresses assigned to interfaces of the nodes may be used as the sequence of node addresses. Here, a node address is appended to the delivery-path search message, on a hop-by-hop basis, by each node via which the delivery-path messages is transferred so that the node addresses stacks up in the data portion 101.

When a router receives a delivery-path search message via a first interface thereof, the router appends, for example, the address of the router to the data portion 101 of the received delivery-path search message, and transfers the delivery-path search message storing the appended router address to a second interface other than the first interface.

Figure 2B:
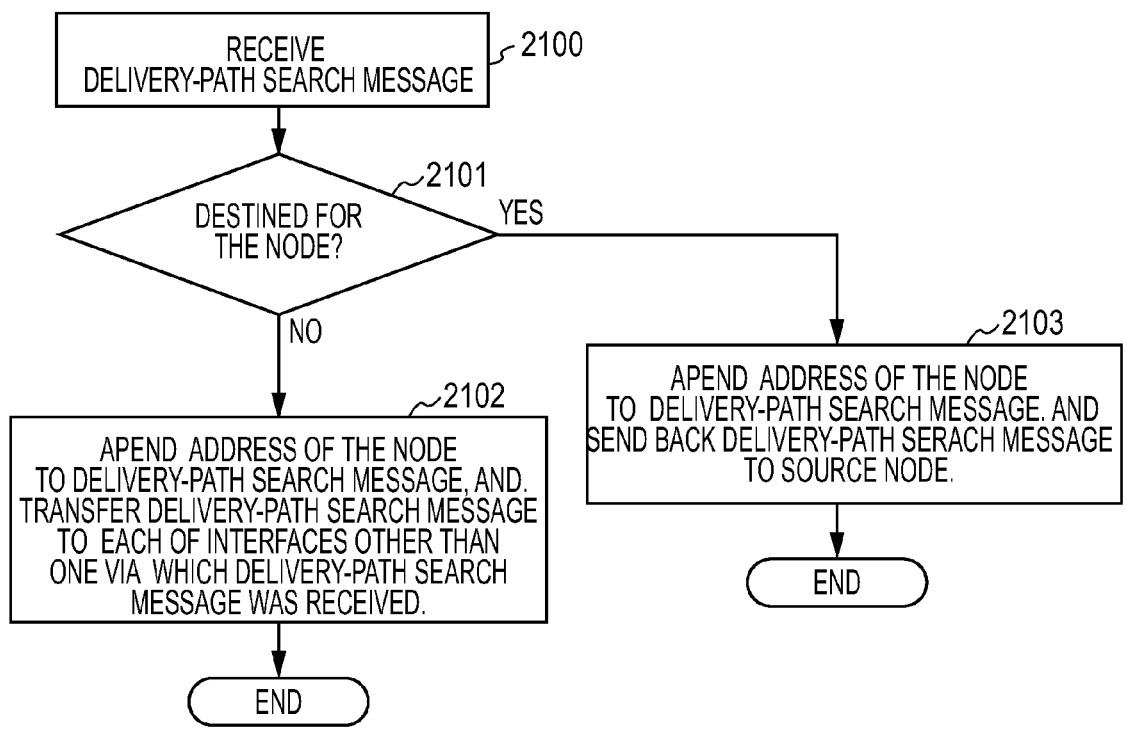
FIG. 2B is a diagram illustrating an example of an operational flowchart performed by a node that has received a delivery-path search message, according to an embodiment.

FIG. 2B is a diagram illustrating an example of an operational flowchart performed by a node that has received a delivery-path search message, according to an embodiment, where the node indicates a router or a server.

In operation 2100, a node receives a delivery-path search message as depicted in FIG. 2A.

In operation 2101, the node determines whether a destination address of the received delivery-path search message indicates the address of the node or not. When the destination address of the delivery-path search message indicates the address of the node (YES in operation 2101), the node appends the address of the node to the data portion 101 of the received delivery-path search message, and sends back the received delivery-path search message toward the source node identified by the source address of the received delivery-path search message (in operation 2103).

Meanwhile, when the destination address of the delivery-path search message does not indicate the address of the node (NO in operation 2101), the node appends the address of the node to the data portion 101 of the delivery-path search message, and transfers the delivery-path search message storing the appended node address to each of interfaces other than the interface via which the delivery-path search message was received (in operation 2102).

Figure 3:
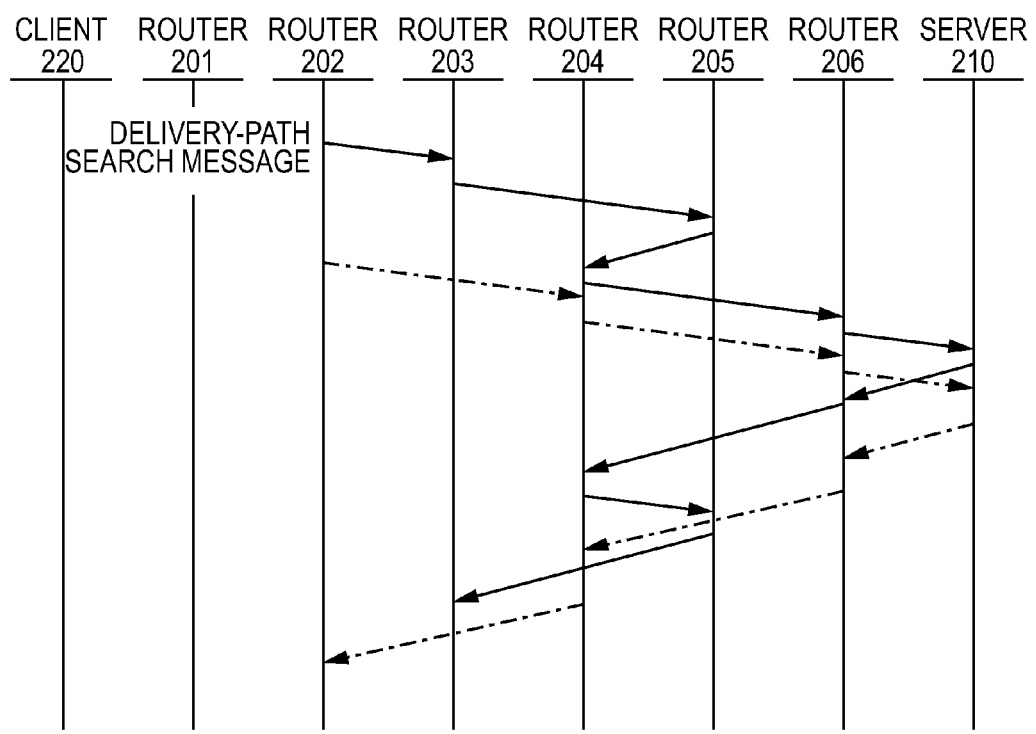
FIG. 3 is a diagram illustrating an example of a transmission sequence for performing delivery-path search processing, according to an embodiment.

FIG. 3 is a diagram illustrating an example of a transmission sequence for performing delivery-path search processing, according to an embodiment. In FIG. 3, a dashed-dotted arrow represents an exemplary transmission sequence of a delivery-path search message that is transferred from the router 202 via a first incoming interface in the direction of the router 204. Meanwhile, a solid arrow represents an exemplary transmission sequence of a delivery-path search message that is transferred from the router 202 via a second incoming interface in the direction of the router 203.

The delivery-path search message transferred from the router 202 via the second incoming interface in the direction of the router 203 reaches the server 210 through a forward route including the routers 203, 205, 204, and 206. Here, the respective routers 203, 205, 204, and 206 append the addresses of the routers (or interfaces) in the data portion 101 of the delivery-path search message (as illustrated in FIG. 2A).

Upon receiving the delivery-path search message, the server 210 exchange, within the header portion 100 (illustrated in FIG. 2A) of the delivery-path search message, the source address (for example, IP address of the router 202) with the destination address (for example, IP address of the server 210), and transmits the delivery-path search message in which the source and destination addresses are exchanged toward the router 202. This allows the delivery-path search message to be sent back from the server 210 to the router 202 along a backward route that is the same as the forward route through which the delivery-path search message has been transferred from the router 202 to the server 210. In the case of the backward route, the addresses of the nodes via which the delivery-path search message has been transferred are stored in the data portion 101 of the delivery-path search message in the same way that the delivery-path search message is transferred through the forward route.

The processing for determining a second incoming interface and the delivery-path search processing mentioned above are performed by each of routers (including the router 202) after all the routers relating to the delivery tree turn into an operational state of the convergence of both the unicast and multicast routing protocols. Here, since the router 206 is a first hop router and receives multicast traffic only from the server 210 (sender S1), it is unnecessary for the router 206 to determine a second incoming interface or to perform the delivery-path search processing mentioned above.

Figure 11A:
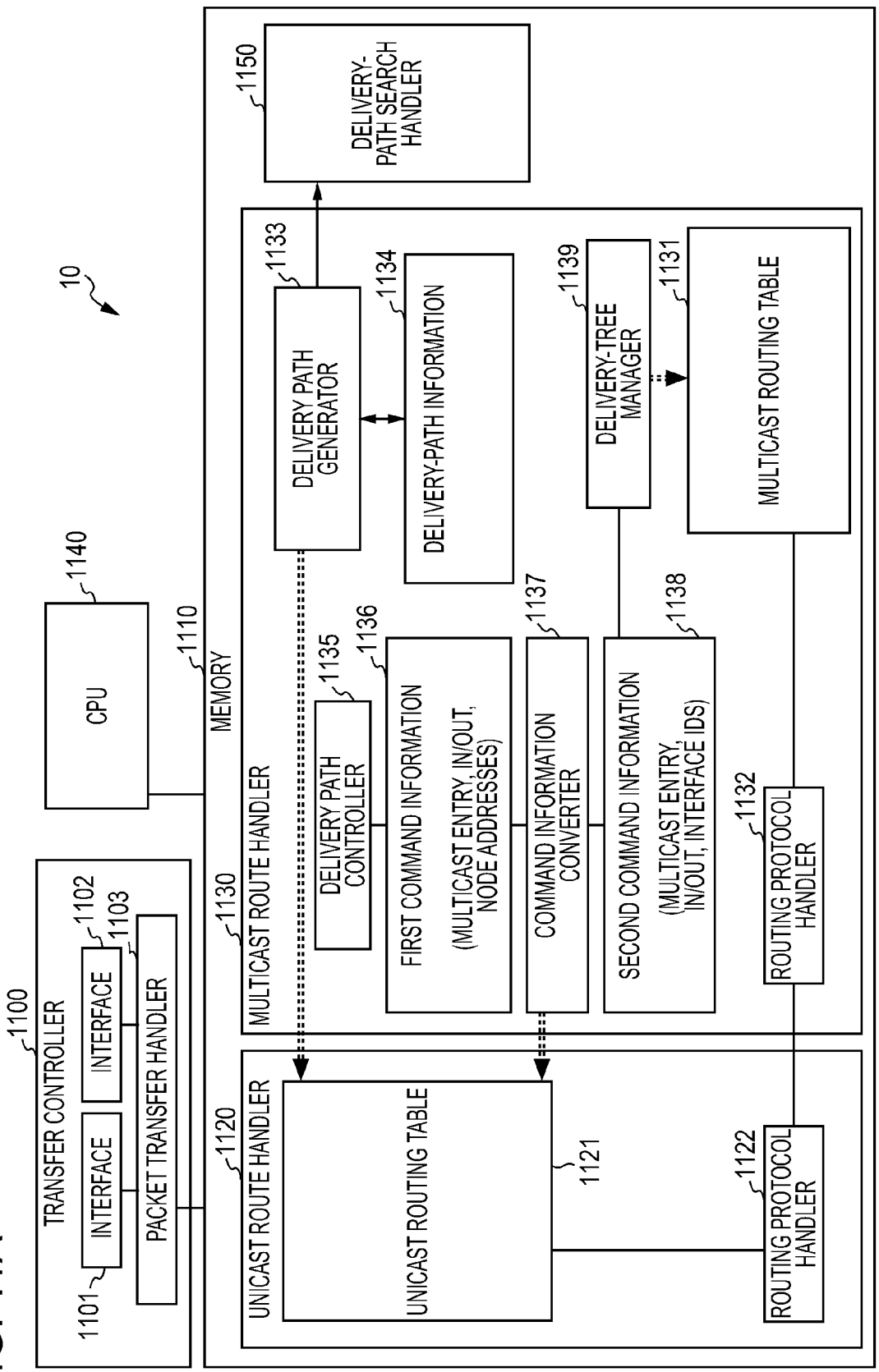
FIG. 11A is a diagram illustrating a configuration example of a router, according to an embodiment.

As a result of performing the alternative path search processing described above, delivery-path information is generated, for example, in a memory of the router, as illustrated in FIGS. 11A and 11D that will be described later. The delivery-path information stores information on a first delivery path (or a primary delivery path) used for transferring the multicast traffic in a normal operational state, and information on a second delivery path (or an alternative delivery path) used as an alternative to the first delivery path when the first delivery path is not working. The delivery-path information stores, for each of multicast entries, as the information on the first or second delivery path, an incoming interface identifier and a sequence of router (or interface) addresses identifying one or more routers located along the delivery path connected to the incoming interface identified by the incoming interface identifier. For example, the delivery-path information 1134 of FIG. 11D (which will be described later) stores, for each of multicast entries, information on first and second delivery paths that is obtained by performing the alternative path search processing on the first and second incoming interfaces of the router 202, respectively. For example, in FIG. 11D, the incoming interface IDs "A" and "B" identify the first and second incoming interfaces of the router 202, respectively, a sequence of router addresses A4, A6 regarding the first incoming interface "A" identify the first delivery path, and a sequence of router addresses A3, A5, A4, A6 regarding the second incoming interface "B" identify the second delivery path.

Figure 4:
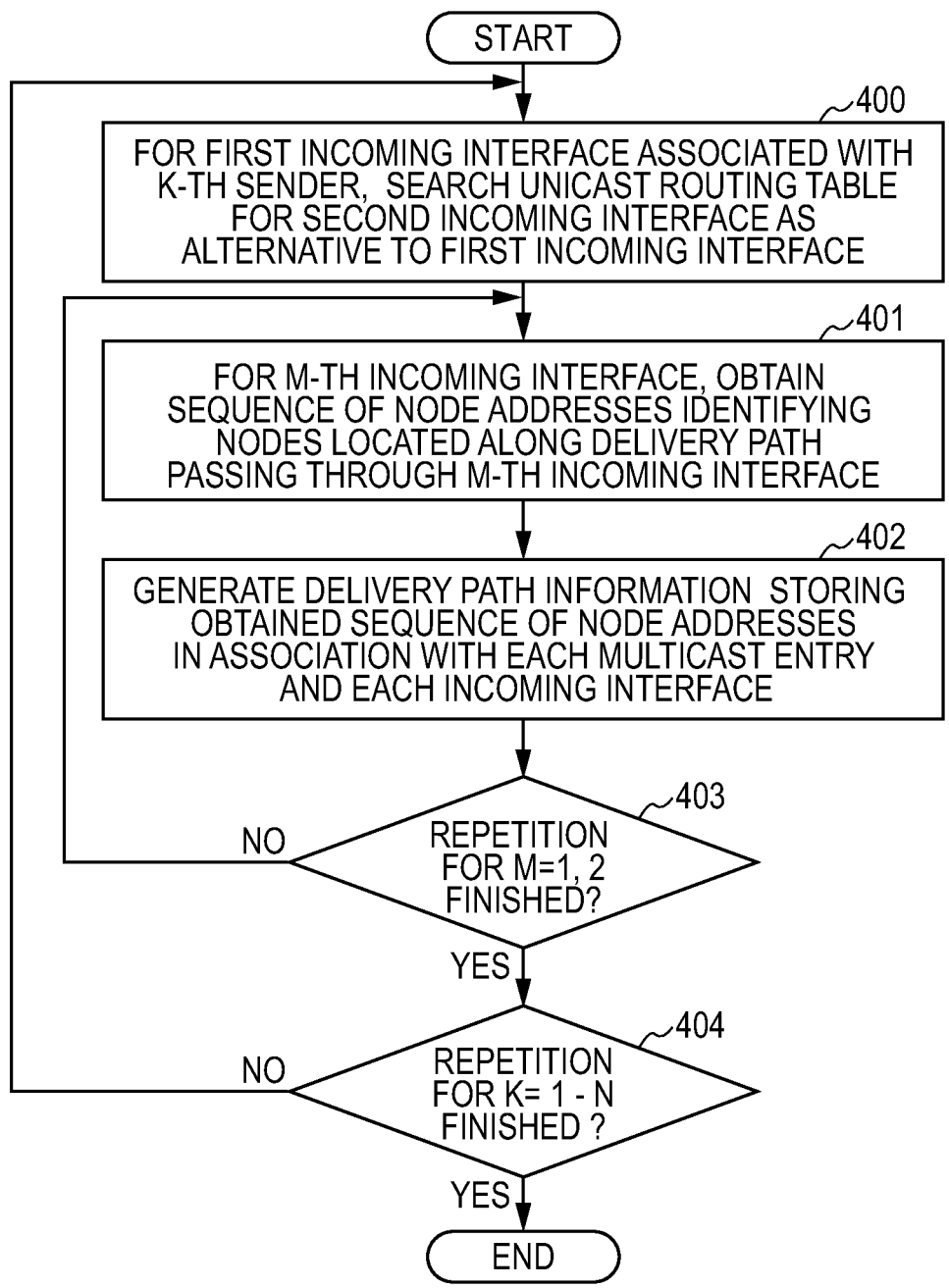
FIG. 4 is a diagram illustrating an example of an operational flowchart for generating delivery path information, according to an embodiment.

FIG. 4 is a diagram illustrating an example of an operational flowchart for generating delivery path information, according to an embodiment. FIG. 4 illustrates the operational flowchart performed by a router on the multicast network.

In operation 400, for a first incoming interface that is associated with k-th sender (sender Sk) within the multicast routing table, the router searches the unicast routing table for a second incoming interface as an alternative to the first incoming interface, where variable k indicates a sender number having integer values 1 to n (n is the maximum number of senders in the multicast network), and Sk identifies a k-th sender. Here, as will be described later, the unicast routing table may be configured, for example, as illustrated in FIG. 11B, and the multicast routing table may be configured, for example, as illustrated in FIG. 11C.

In operation 401, the router determines, for m-th incoming interface, a delivery path passing through the m-th incoming interface by transmitting an delivery-path search message toward the k-th sender, and obtains, as information identifying the determined delivery path, a sequence of node addresses identifying nodes located along the determined delivery path passing through the m-th incoming interface, where variable m indicates an incoming interface number having integer values 1 and 2, and identifies one of first and second incoming interfaces ("1" identifies the first incoming interface and "2" identifies the second incoming interface).

In operation 402, the router generates delivery path information that stores the obtained sequence of node addresses in association with each multicast entry and each incoming interface. In the case, the delivery path information may be configured to store information on a first delivery path (a primary delivery path) used for transferring the multicast traffic in a normal operational state, and information on a second delivery path (an alternative delivery path) used as an alternative to the first delivery path when the first delivery path is not working. For example, as will be later illustrated in FIG. 11D, the delivery path information may be configured as the delivery path information 1134 stored in the memory 1110.

In operations 403, the router repeats the operations 401 to 402 for each of the first and second incoming interfaces, that is, for m=1, 2.

In operations 404, the router repeats the operations 401 to 403 for each of the senders, that is, for k=1 to n.

In the above operational flowchart, it is assumed that the address of the server 210 (a sender address) is known by the router 202. Further, the router 202 also knows the addresses of the routers 203 and 204, for example, by exchanging Hello messages. Further, the router 202 may recognize the addresses of the other routers (for example, routers other than routers 210, 203, and 204) located along the delivery path, from the sequence of node addresses stored in the data portion 101 of the delivery path search message that was sent back from the server 210. That is, the forward and backward routes of the delivery path search message may be identified using the address of the server 210 and the sequence of node addresses stored in the data portion of the delivery path search message.

Further, the router 202 may recognize an alternative delivery path (a second delivery path) passing through the second incoming interface, by identifying the address of the neighboring router, connected to the second incoming interface of the router 202, that is stored as one of the sequence of node addresses in the delivery-path search message. For example, the router 202 may recognize that the alternative delivery path reaches the router 206 through the routers 203, 205, 204, where the router 204 is a previous hop node of the router 202 along the delivery tree, by identifying the address of the neighboring router 203 that is stored as one of the sequence of node addresses identifying nodes along the forward or return route.

Here, one of the purposes of the delivery-path search processing is to obtain the address of each of routers located along an alternative delivery path (a second delivery path). Therefore, when the sequence of node addresses identifying the routers located along the alternative delivery path are acquired by the use of a static setting or another method, the delivery-path search processing mentioned above may not be required to perform.

As a multicast routing protocol, a PIM-SM or a PIM-SSM may be used. According to a PIM-SM, a delivery tree may be configured as a shortest path tree (SPT) or configured to include a shortest path tree (SPT), a shared tree (ST), and a router of a rendezvous point (RP) so that the SPT and the ST are bordered via the RP. In this case, when a PIM-SSM is used, the delivery tree is an SPT since a RP is not used in the PIM-SSM.

Figure 5:
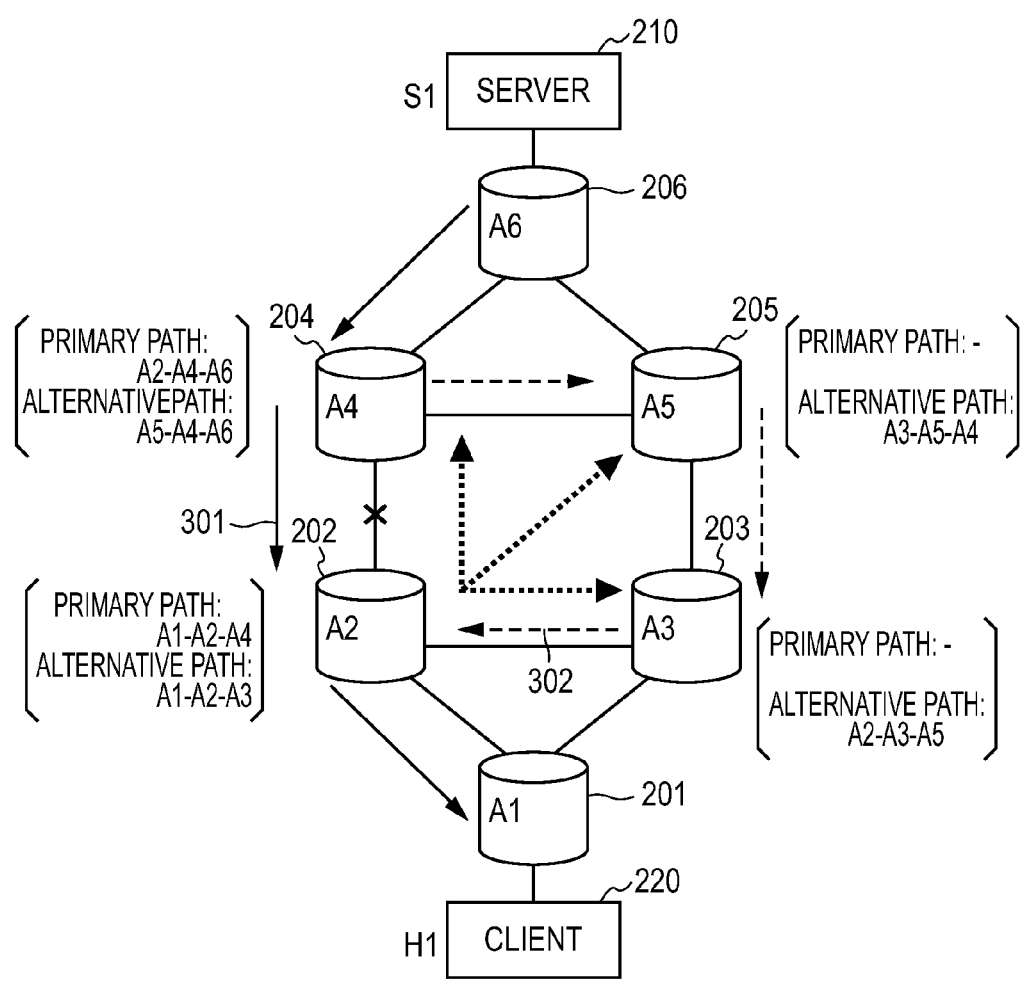
FIG. 5 is a schematic diagram illustrating an operation example for changing an active delivery path from a first delivery path to a second delivery path, according to an embodiment.

FIG. 5 is a schematic diagram illustrating an operation example for changing an active delivery path from a first delivery path to a second delivery path, according to an embodiment.

Figure 6:
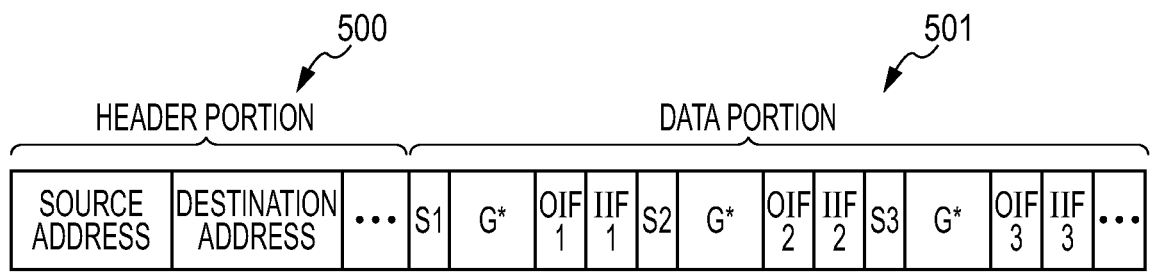
FIG. 6 is a diagram illustrating an example of a delivery-path change message, according to an embodiment.

FIG. 6 is a diagram illustrating an example of a delivery-path change message, according to an embodiment. When a link failure (such as a line failure or a line disconnection caused by a change in network topology) has occurred on a first delivery path included in the delivery tree, the delivery-path change message is transmitted from a router that is closest to the faulty link and located on the downstream side of the faulty link along the first delivery path, to one or more routers that are located on the upstream side of the faulty link along an alternative delivery path (a second delivery path), so that the one or more routers perform delivery-path change processing that changes an active pair of incoming and outgoing interfaces for actually transferring the multicast traffic, from a first pair of incoming and outgoing interfaces passed by the first delivery path to a second pair of incoming and outgoing interfaces passed by the second delivery path without waiting for the multicast routing table being updated using the multicast protocol.

The delivery-path change message may be configured to store information on multicast entries relating to the link failure, in association with incoming and outgoing interface information identifying a pair of incoming and outgoing interfaces to be passed by an alternative delivery path (a second delivery path). Hereinafter, for convenience of explanation, a router to which the delivery-path change message is transmitted is also referred to as "a target router".

As depicted in FIG. 6, for example, the delivery-path change message may be configured to have a format including a header portion 500 and a data portion 501. Header portion 500 includes source and destination addresses of the delivery-path change message. Data portion 501 includes information used for performing the delivery-path change processing. For example, data portion 501 is configured to include one or more entries each including a sender address of the multicast traffic, one or more multicast group addresses associated with the sender identified by the sender address, a pair of incoming and outgoing interface information. The pair of incoming and outgoing interface information identifies a pair of incoming and outgoing interfaces that are to be passed by the alternative delivery path, that is, the second pair of interfaces passed by the second delivery path (the alternative delivery path) as mentioned above.

For example, the incoming interface information may be configured to be an address (for example an IP address) assigned to a router that is located adjacent to the target router, along the alternative delivery path, on the upstream side of the target router, and the outgoing interface information may be configured to be an address assigned to a router that is located adjacent to the target router, along the alternative delivery path, on the downstream side of the target router. The target router, upon receiving the delivery-path change message, sets a pair of incoming and outgoing interfaces identified by the pair of incoming and outgoing interface information stored in the received delivery-path change message so that the alternative delivery path (the second delivery path) passes through the pair of incoming and outgoing interfaces. As a result, the multicast traffic of each of the multicast groups having the same sender address is transferred via the pair of outgoing and incoming interfaces that are passed by the alternative delivery path.

In FIG. 6, when variable k indicates a sequential natural number assigned to each of entries stored in the data portion 501, k-th entry includes sender address Sk, multicast group addresses G* associated with the sender identified by sender address Sk, outgoing interface information OIFk, and incoming interface information IIFk.

For example, the router 202 transmits, using a unicast routing protocol, the delivery-path change message to routers (target routers) that are each required to change at least one of the pair of incoming and outgoing interfaces that is currently used for transmitting the multicast traffic or required to newly set a pair of incoming and outgoing interfaces, so that the multicast traffic is transferred via the changed or newly set pair of incoming and outgoing interfaces that are passed by the alternative delivery path (a second delivery path) diverting the faulty link.

Figure 7:
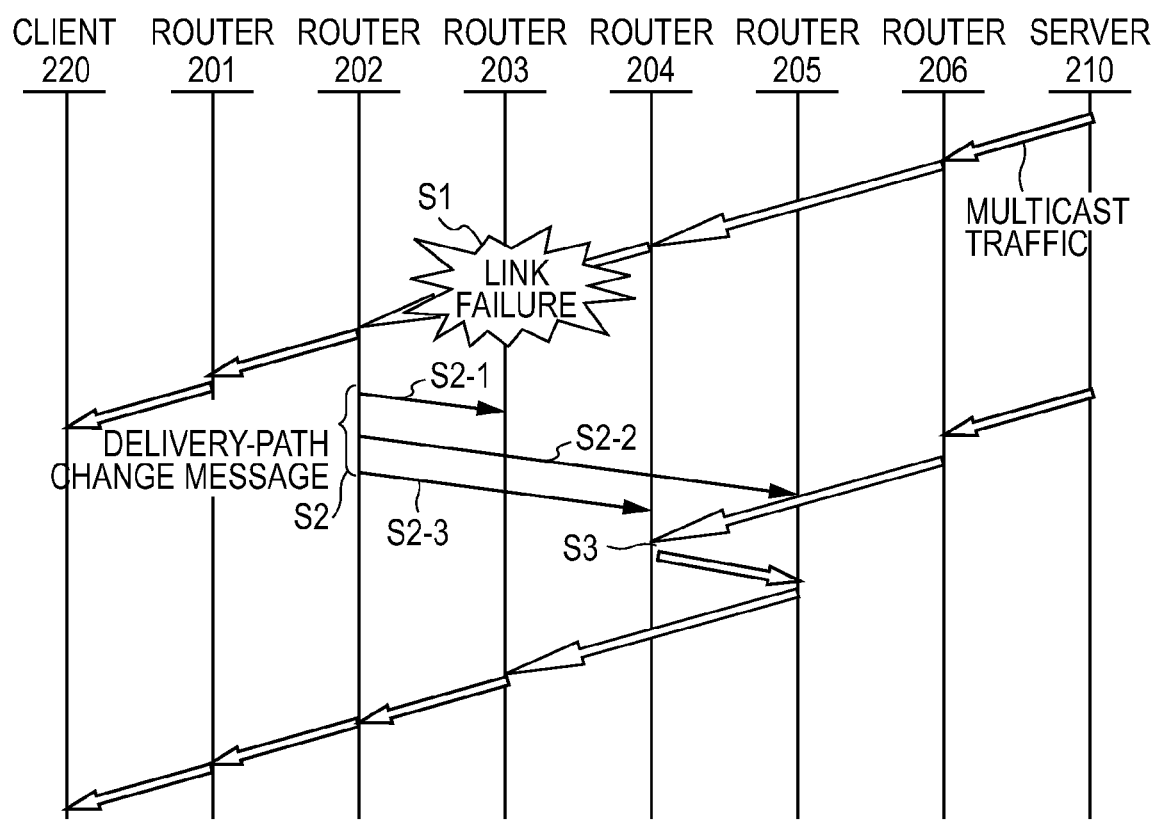
FIG. 7 is a diagram illustrating an example of a transmission sequence of a delivery-path change message, according to an embodiment.

FIG. 7 is a diagram illustrating an example of a transmission sequence of a delivery-path change message, according to an embodiment.

The routers 202 and 204 of FIG. 5 are each configured to detect a link failure, such as a line failure or a line disconnect, by detecting input loss, for example, using a detector circuit for detecting signal input, or using a hello message based on a PIM.

In FIG. 7, upon detecting a link failure at a link connecting routers 202 and 204 (in sequence S1 of FIG. 7), the router 202 transmits a delivery-path change message to routers (target routers) that are each required to change at least one of the pair of incoming and outgoing interfaces currently being used for transmitting the multicast traffic or required to newly set a pair of incoming and outgoing interfaces, so that the multicast traffic is transferred via the changed or newly set pair of incoming and outgoing interfaces that are passed by an alternative delivery path (a second delivery path) diverting the faulty link. In the case, the delivery-path change message is transmitted to the routers 203, 205, 204 as depicted by sequences S2-1, S2-2, S2-3 of FIG. 7.

In the example of FIG. 5, when a failure has occurred at the link connecting the routers 204 and 202, it may be desirable that an active delivery path for actually transferring the multicast traffic is changed from a primary delivery path (a first delivery path) passing through routers 204, 202, to an alternative delivery path (a second delivery path) passing through routers 204, 205, 203, 202 in this order. In order to perform the above mentioned change of the delivery tree, it is required that the router 204 changes the outgoing interface to which the multicast traffic is being transferred, and the routers 205 and 203 each change the pair of incoming and outgoing interfaces via which the multicast traffic is being transferred. Therefore, the router 202 transmits the delivery-path change message to each of the routers 204, 205, 203 (as denoted by transmission sequences S2-1, S2-2 and S2-3 in FIG. 7). Further, the router 202 is required to change an active incoming interface for actually receiving the multicast traffic, from the currently-used first incoming interface to the alternative second incoming interface.

The routers 202 to 205 each change an active pair of incoming and outgoing interfaces from the currently-used pair of incoming and outgoing interfaces to an alternative pair of incoming and outgoing interfaces passed by the alternative delivery path, according to the information stored in the received delivery-path change message. As a result, the alternative delivery path is established along the route that starts from the router 204 and reaches the router 202 via the routers 205 and 203. As a result, the multicast traffic is transferred from the server 210 to the router 202 through the established alternative delivery path even when the failure has occurred at the link connecting the routers 204 and 202 that is passed by the currently-used delivery path (the first delivery path).

The transmission of the multicast traffic using the alternative delivery path that was established as mentioned above may be started (as depicted by transmission sequence S3 in FIG. 7) without waiting for the convergence of the unicast and multicast protocol regarding the delivery tree, that is, without waiting for the condition in which network topology information and routing information stored in each of routers relating to the delivery tree are updated based on the unicast and multicast protocols due to the link failure occurrence.

The multicast routing table to be updated by a router that has received the delivery-path change message may be configured, for example, as multicast routing table 1131 in the memory 1110 as depicted in FIG. 11C that will be described later.

Figure 8:
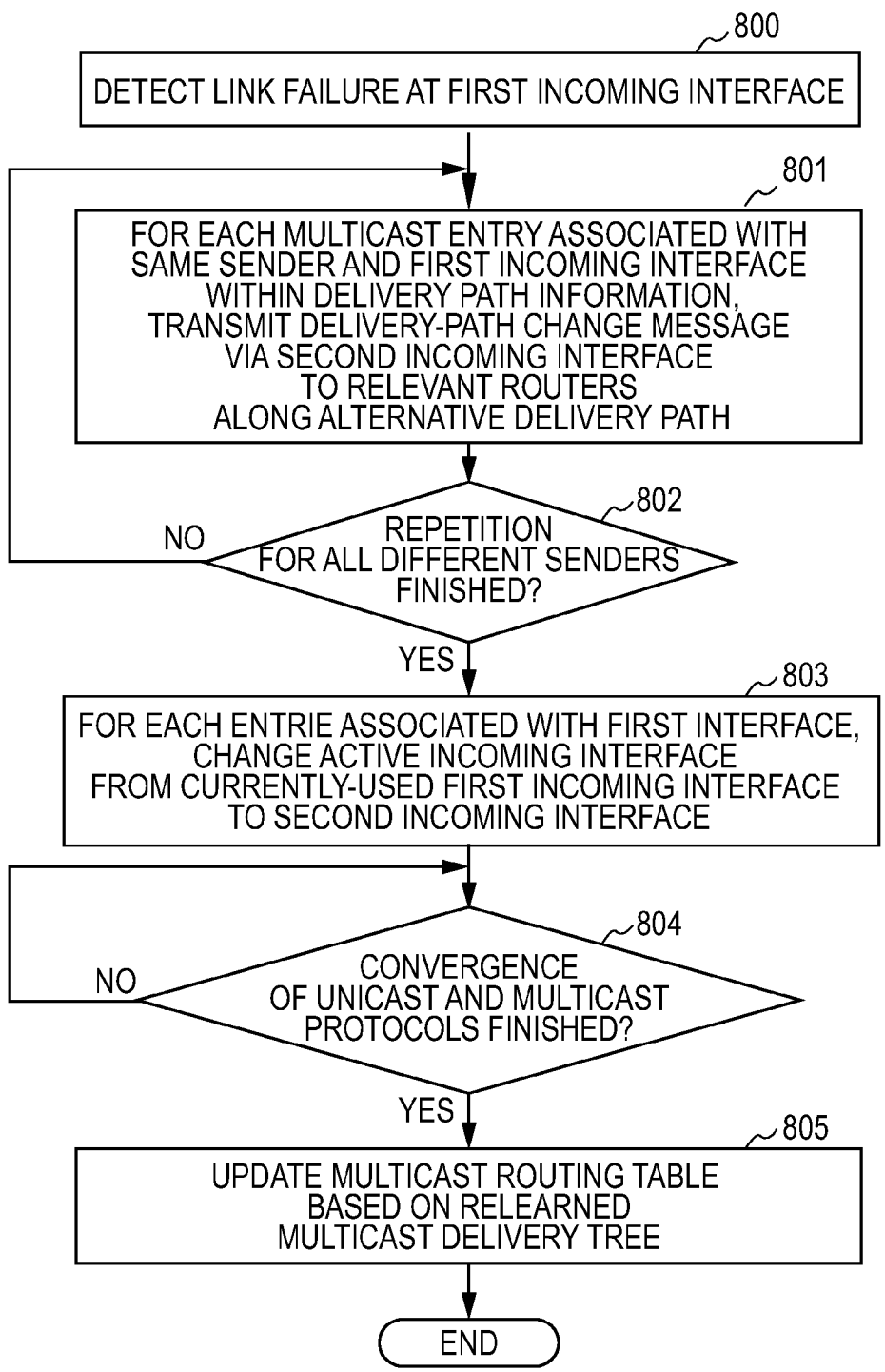
FIG. 8 is a diagram illustrating an example of an operational flowchart performed by a router that has detected a link failure, according to an embodiment.

FIG. 8 is a diagram illustrating an example of an operational flowchart performed by a router that has detected a link failure, according to an embodiment. The example of FIG. 8 indicates an operational flowchart performed by a router that has detected a link failure, such as a line failure or a link disconnection caused by a change in topology of the delivery tree, where the router is located adjacent to the faulty link on the downstream side of the faulty link. In the case, the router transmits a delivery-path change message to the relevant routers along the alternative delivery path.

In operation 800, the router detects a link failure, such as a line failure or a link disconnection, at a first incoming interface.

In operation 801, the router refers to the delivery path information that was generated as illustrated in FIG. 4. In the case, for each of multicast entries associated the same sender and associated with the first incoming interface, the router transmits, via a second incoming interface as an alternative to the first incoming interface, a delivery-path change message to the relevant routers along the alternative delivery path (the second delivery path). Here, the relevant routers are target routers that are required to change an active pair of incoming and outgoing interfaces for actually transferring the multicast traffic, and the delivery-path change message includes information identifying an alternative pair of incoming and outgoing interface that are to be set as the active pair of incoming and outgoing interfaces.

In operation 802, the router repeats the operation 801 for all the different sender addresses within the delivery path information.

In operation 803, for each of the multicast entries associated with the first incoming interface, the router changes an active incoming interface for actually receiving the multicast traffic, from the first incoming interface to the corresponding second incoming interface passed by the alternative delivery path.

In operation 804, when the convergence of the unicast and multicast routing protocols is completed (YES in operation 804), the router updates the multicast routing table (for example, multicast routing table 1131 in the memory 1110 as depicted in FIG. 11C), based on the relearned delivery tree of the multicast traffic (in operation 805), and finishes the process depicted in FIG. 8.

Figure 9:
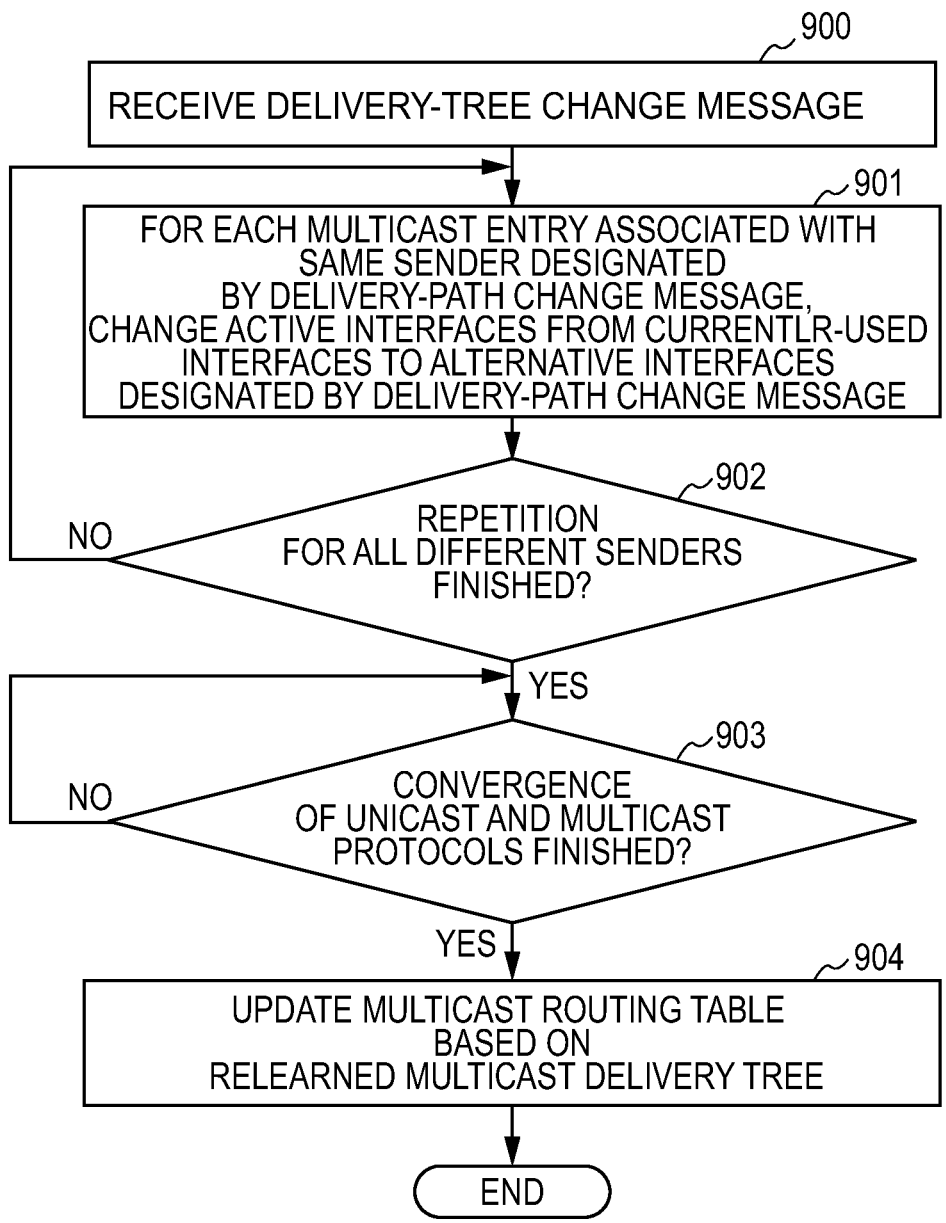
FIG. 9 is a diagram illustrating an example of an operational flowchart for changing an active delivery upon receiving a delivery-path change message, according to an embodiment.

FIG. 9 is a diagram illustrating an example of an operational flowchart for changing an active delivery path upon receiving a delivery-path change message, according to an embodiment. In FIG. 9, when a router along the alternative delivery path receives a delivery-tree change message, using the unicast communication protocol, from a downstream router that has detected a link failure, the upstream router changes an active delivery path for actually transferring the multicast traffic, from the currently-used first delivery path to an alternative second delivery path.

In operation 900, a router located along the alternative delivery path receives a delivery-path change message from a downstream router that has detected a link failure.

In operation 901, for each of multicast entries associated with the same sender designated by the received delivery-path change message, the router changes an active pair of incoming and outgoing interfaces for actually transferring the multicast traffic, from the currently-used pair of incoming and outgoing interfaces to an alternative pair of incoming and outgoing interfaces designated by the received delivery-path change message.

In operation 902, the router performs the operation 901 for all the different senders designated by the delivery-tree change message.

In operation 903, when the convergence of the unicast and multicast routing protocols (in other words, the relearning of the delivery tree) is finished (YES in operation 903), the router updates the multicast routing table based on the relearned multicast delivery tree (in operation 904), and then finishes the processing.

Figure 10:
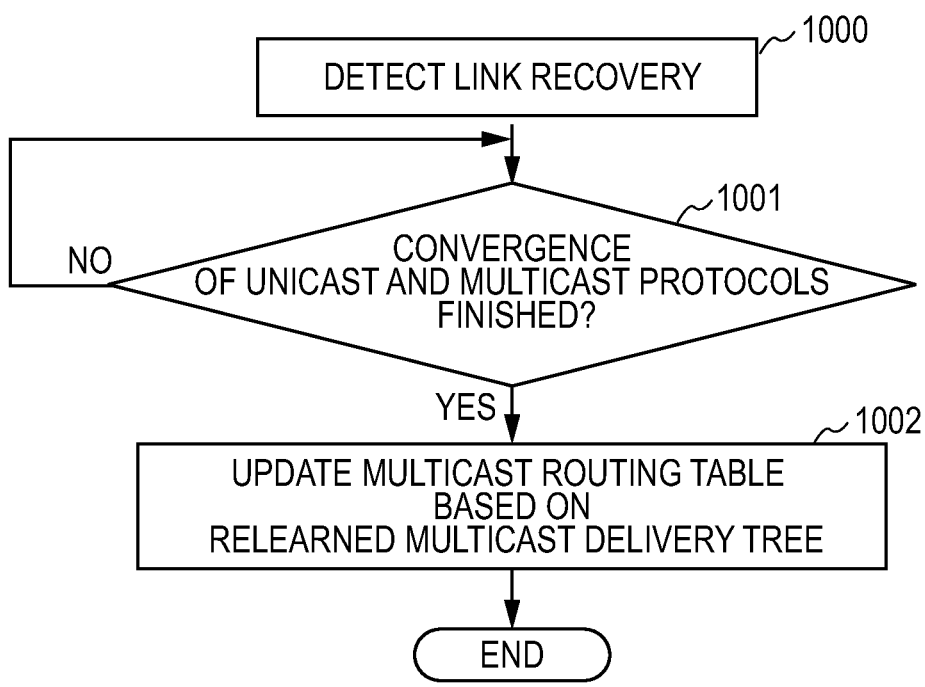
FIG. 10 is a diagram illustrating an example of an operational flowchart for changing an active delivery-path when a link recovery is detected, according to an embodiment.

FIG. 10 is a diagram illustrating an example of an operational flowchart for changing an active delivery-path when a link recovery is detected, according to an embodiment. In the case, the operational flowchart is performed, for example, by a router that is located adjacent, on the downstream side, to the recovered link. Here, for example, the link recovery may be detected when the faulty link is recovered or the link is connected due to a change in a network topology.

In operation 1000, a router detects a link recovery (for example, a line recovery or a link connection).

In operation 1001, the router waits for the completion of the convergence of the unicast and multicast routing protocols (in other words, the relearning of the delivery tree).

In operation 1002, the router updates the multicast routing table based on the relearned delivery tree, and finishes the processing. Here, the multicast routing table may be configured as depicted in FIG. 11C (multicast routing table 1131) that will be described later.

In the case, when the operation 1002 of FIG. 10 has finished, within the multicast routing table, for example, the data associated with the multicast entry (S1, G1) is restored to the original data before the occurrence of the link failure. That is, the data associated with multicast entry (S1, G1) within the multicast routing table of the router 202 returns to the original data indicating an operational state in which the router 202 receives multicast traffic from the router 204 through the first incoming interface. The operational states of the other routers 204, 205, and 203 also return to the original states before the link failure occurrence by updating the multicast routing tables thereof.

FIG. 11A is a diagram illustrating a configuration example of a router, according to an embodiment. FIG. 11A illustrates a configuration example of router 10 which may be applied to the routers 201-206 depicted in FIG. 1. FIG. 11B illustrates a configuration example of a unicast routing table. FIG. 11C illustrates a configuration example of a multicast routing table. FIG. 11D illustrates a configuration example of delivery path information.

The router 10 may be configured to include a central processing unit (CPU) 1140, a memory 1110, and a transfer controller 1100.

The CPU 1140 runs a program stored in the memory 1110 so as to perform various processes including routing protocol control for unicast and multicast communications, buck-up path generation, and alternative path control.

The memory 1110 stores programs to be executed by the CPU 1140 and data to be used when the program is executed.

The memory 1110 may be configured to include a RAM used as a main memory, a ROM for storing firmware, a hard disk for storing programs and data, and an auxiliary storage such as a memory card.

The transfer controller 1100, for example, includes a packet transfer handler 1103 that controls a packet transfer by determining an interface to which a unicast or multicast packet is to be transferred, and interfaces 1101 and 1102 each performing transmission of packets in cooperation with the packet transfer handler 1103. The transfer controller 1100 may be implemented using dedicated or general-purpose hardware devices, such as electric and electronic circuits (IC, LSI, ASIC, etc.), that control sending, receiving, and transferring a packet signal.

The memory 1110 may be configured to include a unicast route handler 1120, a multicast route handler 1130, and a delivery-path search handler 1150. For example, the unicast route handler 1120, the multicast route handler 1130, and the delivery-path search handler 1150 may be implemented as programs executed by the CPU 1140.

The delivery-path search handler 1150 controls transmission of a delivery-path search message for tracing a delivery path, so that the delivery-path search message is not returned to an interface via which the delivery-path search message is received.

The unicast route handler 1120 may be configured to include a unicast routing table 1121 and a routing protocol handler 1122. The unicast routing table 1121 includes unicast routing information storing a unicast destination address in association with an interface to which a unicast packet including the unicast destination address is to be outputted. For example, the unicast routing table 1121 may be configured to include a plurality of entries each storing a source address, a destination address, an interface identifier (ID), and a metric, as depicted in FIG. 11B. The routing protocol handler 1122 performs transmission of the unicast routing information and calculates a unicast communication path.

The multicast route handler 1130 may be configured to include a multicast routing table 1131 and a routing protocol handler 1132. For example, the multicast routing table 1131 may be configured as a database including records each storing a multicast entry (Sk, Gp) in association with a pair of incoming and outgoing interfaces, as depicted in FIG. 11C, where variable k has sequential integer values from 1 to m (m is the number of senders), variable p has sequential integer values from 1 to n (n is the number of multicast groups), Sk identifies k-th sender, and Gp identifies p-th multicast group. For example, multicast entry (S1, G1) is associated with a pair of incoming and outgoing interfaces that are identified by interface identifiers A and C, respectively. In FIG. 11C, an incoming interface is denoted by "IN", and an outgoing interface is denoted by "OUT". The routing protocol handler 1132 performs transmission of multicast routing information and calculates a multicast communication path.

The multicast route handler 1130 may be configured to further include a delivery path generator 1133 and a multicast routing table manager 1139. The delivery path generator 1133 generates the delivery path information 1134, in which information on first and second delivery paths is stored in association with each multicast entry and each incoming interface, and notifies another router of information on an alternative delivery path (a second delivery path) by transmitting a delivery-path change message to the another router. The multicast routing table manager 1139 controls a change of the delivery tree.

The multicast route handler 1130 may further include a delivery path controller 1135 and a command information converter 1137. The delivery path controller 1135 receives a delivery-path change message from another router, and generates first command information 1136 by extracting the relevant information from the data portion 502 of the received delivery-path change message. For example, the first command information 1136 includes a pair of incoming and outgoing node addresses for each of multicast entries, where the incoming node address is used for identifying an incoming interface connected to a neighboring node (or interface) identified by the incoming node address, and the outgoing node address is used for identifying an outgoing interface connected to a neighboring node (or interface) identified by the outgoing node address. The command information converter 1137 converts the first command information 1136 generated from the delivery-path change message into second command information 1138 by referring to the unicast routing table 1121.

In the case, the command information converter 1137 converts each pair of incoming and outgoing node addresses stored in the first command information 1136 into the pair of incoming and outgoing interface identifiers corresponding to the each pair of incoming and outgoing node addresses, by searching the unicast routing table 1121 using the each pair of incoming and outgoing node addresses as a search key of destination address, and stores the converted pair of incoming and outgoing interface identifiers, into the second command information 1138 in association with each of the multicast entries.

The delivery path generator 1133 generates the delivery path information 1134 using the multicast routing table 1131 and the unicast routing table 1121, in cooperation with the delivery-path search handler 1150. In the case, the delivery path information 1134 may be configured, for example, to store, for each of multicast entries, a sequence of node addresses identifying nodes located along a delivery path, in association with each of incoming interfaces via which the multicast traffic is to be received. Here, the delivery-path search handler 1150 may be configured to select an alternative delivery path (a second delivery path) that is different from the currently-used delivery path (the first delivery path).

The delivery-tree manager 1139 changes allocation of an active pair of incoming and outgoing interfaces for actually transferring the multicast traffic, based on the second command information 1138, so that, for each of multicast entries associated with the sender accommodating the delivery path that has stopped delivering the multicast traffic due to the link failure, an active pair of incoming and outgoing interfaces is changed from the currently-used pair of incoming and outgoing interfaces to an alternative pair of incoming and outgoing interfaces designated by the second command information 1138.

When the delivery-tree manager 1139 has changed the allocation of the active pair of incoming and outgoing interfaces as mentioned above, the delivery-tree manager 1139 updates the multicast routing table 1131 so that information on the alternative pair of incoming and outgoing interfaces is registered in the multicast routing table 1131. As a result, the multicast traffic is transferred via the alternative pair of incoming and outgoing interfaces along the alternative delivery path.

When a link failure has occurred and the router 10 has detected the link failure, the delivery path controller 1135 generates the first command information 1136 by extracting the relevant information from the delivery-path information 1134, and the command information converter 1137 converts the first command information 1136 into the second command information 1138. Then, the delivery-tree manager 1139 changes the allocation of an active pair of incoming and outgoing interfaces for actually transferring the multicast traffic, based on the second command information 1138, so that, for each of multicast entries associated with the sender accommodating the delivery path that has stopped delivering the multicast traffic due to the link failure, an active pair of incoming and outgoing interfaces is changed from the currently-used pair of incoming and outgoing interfaces to an alternative pair of incoming and outgoing interfaces that is passed by the alternative delivery path.

Then, the delivery-tree manager 1139 updates the multicast routing table 1131 so that information on the alternative pair of incoming and outgoing interfaces is registered in the multicast routing table 1131. Thereafter, when a multicast packet arrives at the router 10, the multicast packet is transferred, based on the updated multicast routing table 1131, onto the appropriate one of interfaces 1101 and 1102 by packet transfer handler 1103.

When a link failure has occurred but the router 10 has not detected the link failure, the delivery path controller 1135 of router 10 receives a delivery-tree change message that has been transmitted from a router at which the link failure was detected. Then, the first command information 1136 is generated from the received delivery-path change message, and the first command information is converted into the second command information 1138. Then, an active pair of incoming and outgoing interfaces for actually transferring the multicast traffic is changed from the currently-used pair of incoming and outgoing interfaces to an alternative pair of incoming and outgoing interfaces based on the second command information 1138. At the same time, the multicast routing table 1131 is updated according to the second command information 1138, in the similar manner as described above. Thereafter, when a multicast packet arrives at the router, the multicast packet is transferred, based on the updated multicast routing table 1131, onto the appropriate one of interfaces 1101 and 1102 by packet transfer handler 1103.

According to a system according to the embodiment, each of a plurality of routers relating to the delivery tree holds information on an alternative delivery path for at least one multicast entry. This allows the each router to determine, instead of a first incoming interface via which the multicast traffic is currently received from the sender based on the present delivery tree, a second incoming interface capable of receiving the multicast traffic from the sender through the alternative delivery path, and to receive the multicast traffic via the determined second incoming interface.

Further, each router may search for a delivery path through which the multicast traffic is allowed to be transferred from a sender to the each router, by transmitting a delivery-path search message toward the sender, and obtain addresses of the respective routers located on the delivery path that was searched for, thereby holding information on first and second delivery paths (primary and alternative delivery paths) each communicably coupling the sender and the each router. In the case, transmission of the delivery-path search message is controlled so that the delivery-path search message is not transferred to an interface via which the delivery-path search message is received by the each router.

A router that was rendered unable to receive the multicast traffic via the first incoming interface because of the link failure, for example, a router that is located adjacent to the faulty link along the currently-used delivery path or located on the downstream side of the faulty link along the currently-used delivery path, transmits a delivery-path change message to one or more routers located along the alternative delivery path so that the router is allowed to receive the multicast traffic via a second incoming interface passed by an alternative delivery path. Upon receiving the delivery-path change message, the one or more routers each establishes the alternative delivery path and rewrites the multicast routing table 1131 so that the multicast traffic flows through the alternative delivery path.

In this way, the multicast traffic is transferred, for example, from the server 210 (sender S1) to the client 220 (receiver H1) through the alternative delivery path without waiting for the convergence of the unicast and multicast routing protocols regarding the delivery tree, in other words, without waiting for the updates of the unicast and multicast routing tables that are performed based on the unicast and multicast routing protocols. Therefore, an active delivery path for actually transferring the multicast traffic may be changed more quickly than the conventional method using the unicast and multicast routing protocols, thereby reducing a time period during which the delivery of the multicast traffic is being stopped or interrupted due to the link failure.

Further, a delivery-path change message is configured to include, as information identifying a pair of incoming and outgoing interface passed by the alternative delivery path, a sequence of node address assigned to routers or interfaces along an alternative delivery path, which are obtained by delivery-path search processing, in association with information on the multicast entries to be changed. This allows a router having received the delivery-path change massage to quickly change an active delivery path for actually transferring the multicast traffic. In the case, for example, as a pair of incoming and outgoing interface identifiers of the router, a loopback address of a peer router of the router, an interface address of the peer router, and an interface address of the router may be used.

Thereafter, when the unicast and multicast routing tables of each of the relevant routers are updated according to the reconfiguration of the delivery tree (the relearning of the delivery tree by the each router) that is caused by the link-failure occurrence, the each router controls transfer of the multicast traffic based on the updated multicast routing table.

When the link failure is recovered afterward, the update of the topology information that is performed, periodically or with being triggered by the recovery of the link failure, based on the unicast and multicast routing protocols. As a result, the delivery tree returns to the original state before the link-failure occurrence, allowing the each router to receive the multicast traffic through the first incoming interface.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:
1. A system for changing a delivery path of multicast traffic, the system comprising:
 a plurality of routers via which the multicast traffic is transferred from a sender to a plurality of receivers through a delivery tree that is determined at least based on a multicast routing protocol and includes a set of delivery paths each communicably coupling the sender and one of the plurality of receivers, the plurality of routers each configured to:
  include a multicast routing table storing transfer control information for transferring the multicast traffic through the delivery tree;
  generate delivery path information that stores information on a first delivery path used for transferring the multicast traffic in a normal operational state, and information on a second delivery path used as an alternative to the first delivery path when the first delivery path is not working;
  perform, upon detecting a link failure on the first delivery path, delivery-path change processing, based on the delivery path information, that changes an active pair of interfaces for actually transferring the multicast traffic, from a first pair of interfaces along the first delivery path to a second pair of interfaces along the second delivery path without waiting for the multicast routing table being updated using the multicast protocol;
  transmit a delivery-path change message to first one or more routers positioned along the second delivery path so that the first one or more routers perform the delivery-path change processing based on the delivery-path change message; and
  perform, upon receiving a delivery-path change message, the delivery-path change processing based on the received delivery-path change message.

2. The system of claim 1, wherein,
when the each router includes a first interface via which the multicast traffic is received through the first delivery path, the each router generates the delivery path information in such a manner that
  the each router determines a second interface via which the multicast traffic is allowed to be received,
  the each router transmits via the second interface a delivery-path search message destined for the sender so as to search for the second delivery path that is usable as an alternative to the currently-used first delivery path,
  each of second one or more routers positioned along the second delivery path, upon receiving the delivery-path search message via a third interface, appends an address of the each of the second one or more routers to the delivery-path search message, and transfers the delivery-path search message to a fourth interface different from the third interface, and
  the each router, upon receiving the delivery-path search message that is transmitted from the second interface to the sender via the second one or more routers along the second delivery path and sent back from the sender to the first router through the second delivery path, generates the delivery path information storing, as information on the second delivery path, a sequence of router addresses that are stored in the received delivery-path search message and indicate addresses of the second one or more routers along the second delivery-path; and
the first router generates the delivery-path change message to be transmitted so that the delivery-path change message stores, as information identifying the second pair of interfaces, router addresses included in the sequence of router addresses stored in the delivery path information.

3. The system of claim 1, wherein
the delivery-path change processing updates the multicast routing table based on the delivery path information so that the multicast traffic is transferred through the second delivery path based on the updated multicast routing table.

4. The system of claim 3, wherein
the multicast routing table is further updated based on a relearned delivery-tree that is determined using the multicast protocol after the multicast routing table is updated based on the delivery path information by the delivery-path change processing.

5. A method for changing a delivery path of multicast traffic that is transferred from a sender to a plurality of receivers via a plurality of routers, the method comprising:
  updating, by the each router, a multicast routing table storing transfer control information for transferring the multicast traffic through a delivery tree that is determined at least based on a multicast routing protocol and includes a set of delivery paths each communicably coupling the sender and one of the plurality of receivers;
  generating, by the each router, delivery path information that stores information on a first delivery path used for transferring the multicast traffic in a normal operational state, and information on a second delivery path used as an alternative to the first delivery path when the first delivery path is not working;
  performing, by the each router, upon detecting a link failure on the first delivery path, delivery-path change processing, based on the delivery path information, that changes an active pair of interfaces for actually transferring the multicast traffic, from a first pair of interfaces along the first delivery path to a second pair of interfaces along the second delivery path without waiting for the multicast routing table being updated using the multicast protocol;
  transmitting, by the each router, a delivery-path change message to first one or more routers positioned along the second delivery path so that the first one or more routers perform the delivery-path change processing based on the delivery-path change message; and
  performing, by the each router, upon receiving a delivery-path change message, the delivery-path change processing based on the received delivery-path change message.

6. The method of claim 5, wherein
the generating the delivery path information is performed when the each router includes a first interface via which the multicast traffic is received through the first delivery path, in such a manner that
  the each router determines a second interface via which the multicast traffic is allowed to be received,
  the each router transmits via the second interface a delivery-path search message destined for the sender so as to search for the second delivery path that is usable as an alternative to the currently-used first delivery path,
  each of second one or more routers positioned along the second delivery path, upon receiving the delivery-path search message via a third interface, appends an address of the each of the second one or more routers to the delivery-path search message, and transfers the delivery-path search message to a fourth interface different from the third interface, and
  the first router, upon receiving the delivery-path search message that is transmitted from the second interface to the sender via the second one or more routers along the second delivery path and sent back from the sender to the first router through the second delivery path, generates the delivery path information storing, as information on the second delivery path, a sequence of router addresses that are stored in the received delivery-path search message and indicate addresses of the second one or more routers along the second delivery-path; and the delivery-path change message to be transmitted is generated so that the delivery-path change message stores, as information identifying the second pair of interfaces, router addresses included in the sequence of router addresses stored in the delivery path information.

7. The method of claim 5, wherein
the delivery-path change processing updates the multicast routing table based on the delivery path information so that the multicast traffic is transferred through the second delivery path based on the updated multicast routing table.

8. The method of claim 7, wherein
the multicast routing table is further updated based on a relearned delivery-tree that is determined using the multicast protocol after the multicast routing table is updated based on the delivery path information by the delivery-path change processing.

9. An apparatus for changing a delivery path of multicast traffic that is transferred from a sender to a plurality of receivers via a plurality of routers, the apparatus serving as each of the plurality of routers, the apparatus comprising:

a memory to store a multicast routing table storing transfer control information for transferring the multicast traffic through a delivery tree that is determined at least based on a multicast routing protocol and includes a set of delivery paths each communicably coupling the sender and one of the plurality of receivers; and a processor to:
generate delivery path information that stores information on a first delivery path used for transferring the multicast traffic in a normal operational state, and information on a second delivery path used as an alternative to the first delivery path when the first delivery path is not working, perform, upon detecting a link failure on the first delivery path, delivery-path change processing, based on the delivery path information, that changes an active pair of interfaces for actually transferring the multicast traffic, from a first pair of interfaces along the first delivery path to a second pair of interfaces along the second delivery path without waiting for the multicast routing table being updated using the multicast protocol, transmit a delivery-path change message to first one or more routers positioned along the second delivery path so that the first one or more routers perform the delivery-path change processing based on the delivery-path change message, and perform, upon receiving a delivery-path change message, the delivery-path change processing based on the received delivery-path change message.

* * * * *